July 9, 1929.  C. W. CHENEY  1,720,467
HASP FASTENING FOR EXPANSIBLE SUITCASES, TRUNKS, AND THE LIKE
Filed April 1, 1927  8 Sheets-Sheet 1
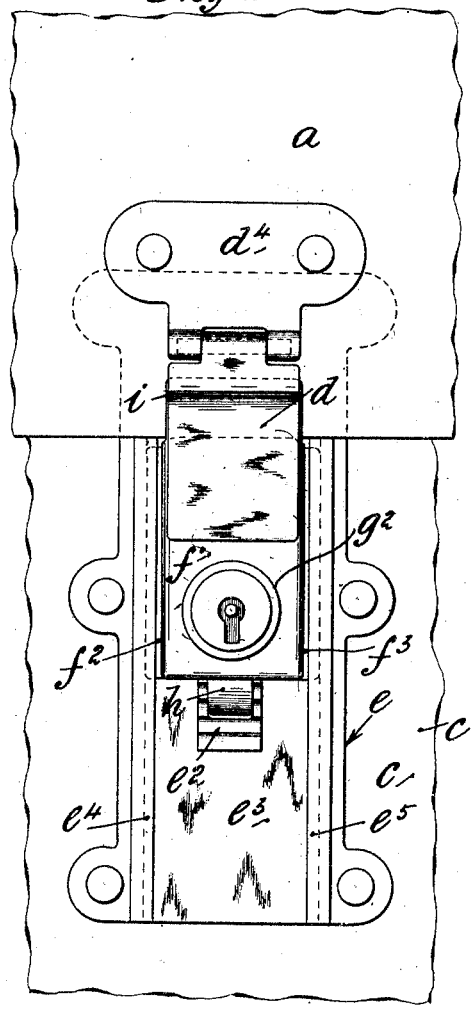
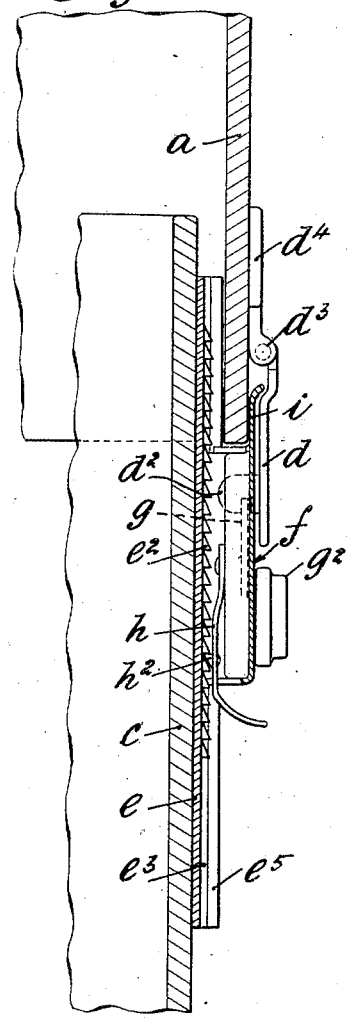

July 9, 1929. C. W. CHENEY 1,720,467
HASP FASTENING FOR EXPANSIBLE SUITCASES, TRUNKS, AND THE LIKE
Filed April 1, 1927 8 Sheets-Sheet 2

Inventor
Charles W. Cheney
By
Attorney

July 9, 1929.  C. W. CHENEY  1,720,467
HASP FASTENING FOR EXPANSIBLE SUITCASES, TRUNKS, AND THE LIKE
Filed April 1, 1927   8 Sheets-Sheet 3
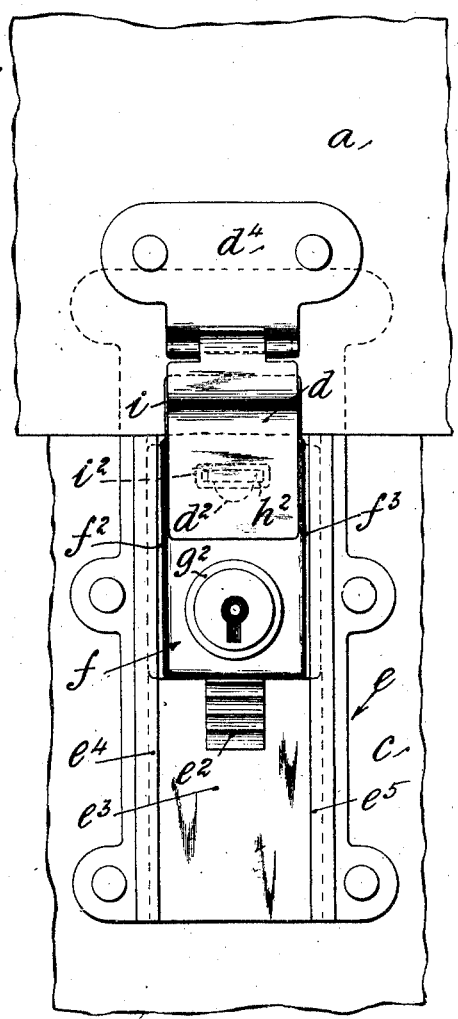
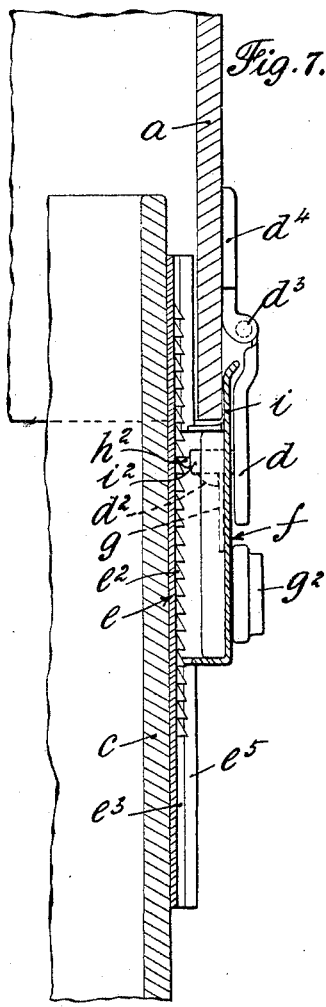
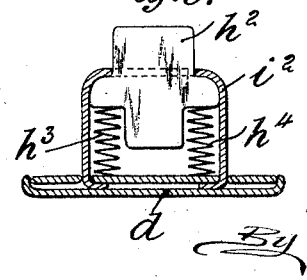
Inventor
Charles W. Cheney
By
James L. Norris
Attorney July 9, 1929.  C. W. CHENEY  1,720,467
HASP FASTENING FOR EXPANSIBLE SUITCASES, TRUNKS, AND THE LIKE
Filed April 1, 1927   8 Sheets-Sheet 4

Inventor
Charles W. Cheney
By
Attorney

July 9, 1929.  C. W. CHENEY  1,720,467
HASP FASTENING FOR EXPANSIBLE SUITCASES, TRUNKS, AND THE LIKE
Filed April 1, 1927   8 Sheets-Sheet 5
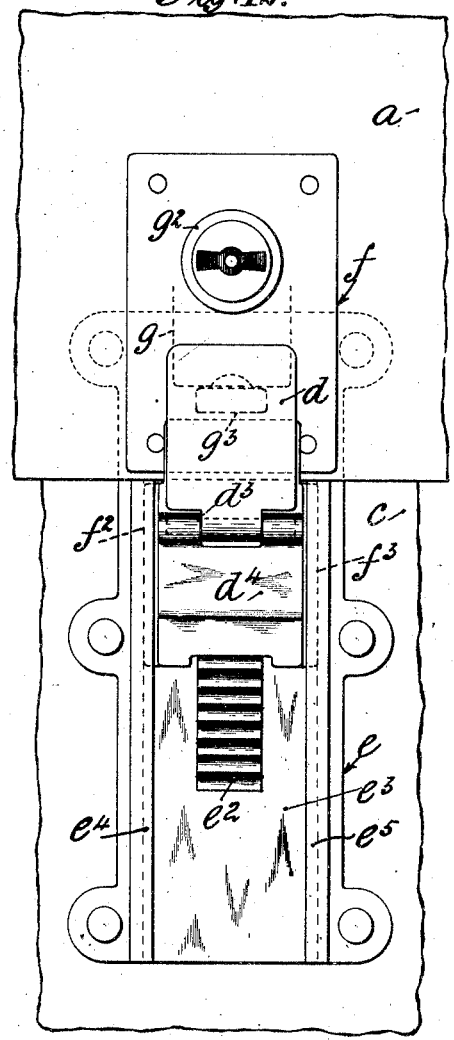
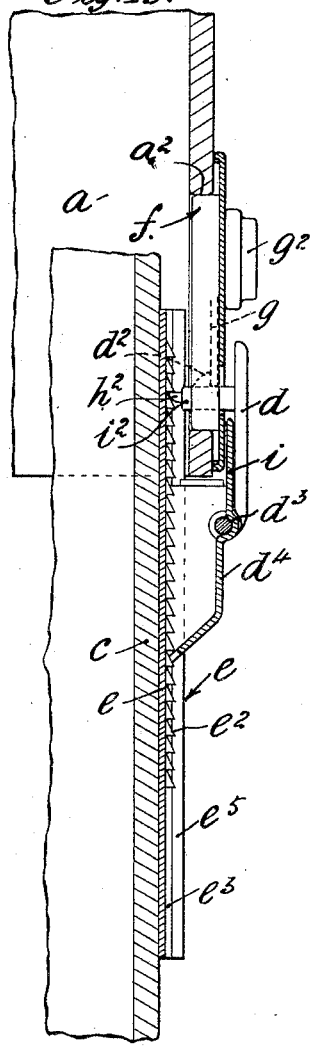
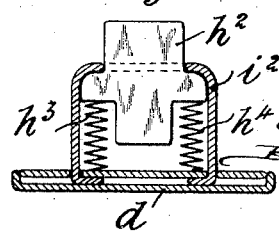
Inventor
Charles W. Cheney
By
James L. Norris
Attorney

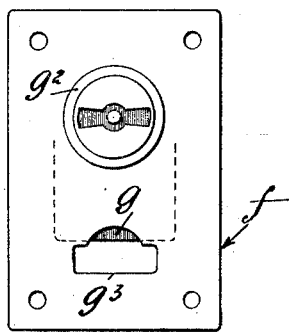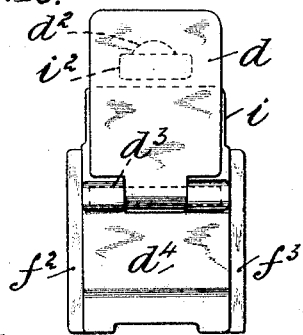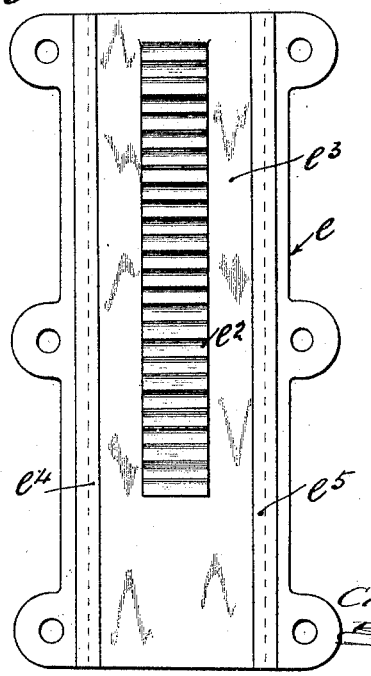

July 9, 1929.　　C. W. CHENEY　　1,720,467
HASP FASTENING FOR EXPANSIBLE SUITCASES, TRUNKS, AND THE LIKE
Filed April 1, 1927　　8 Sheets-Sheet 7
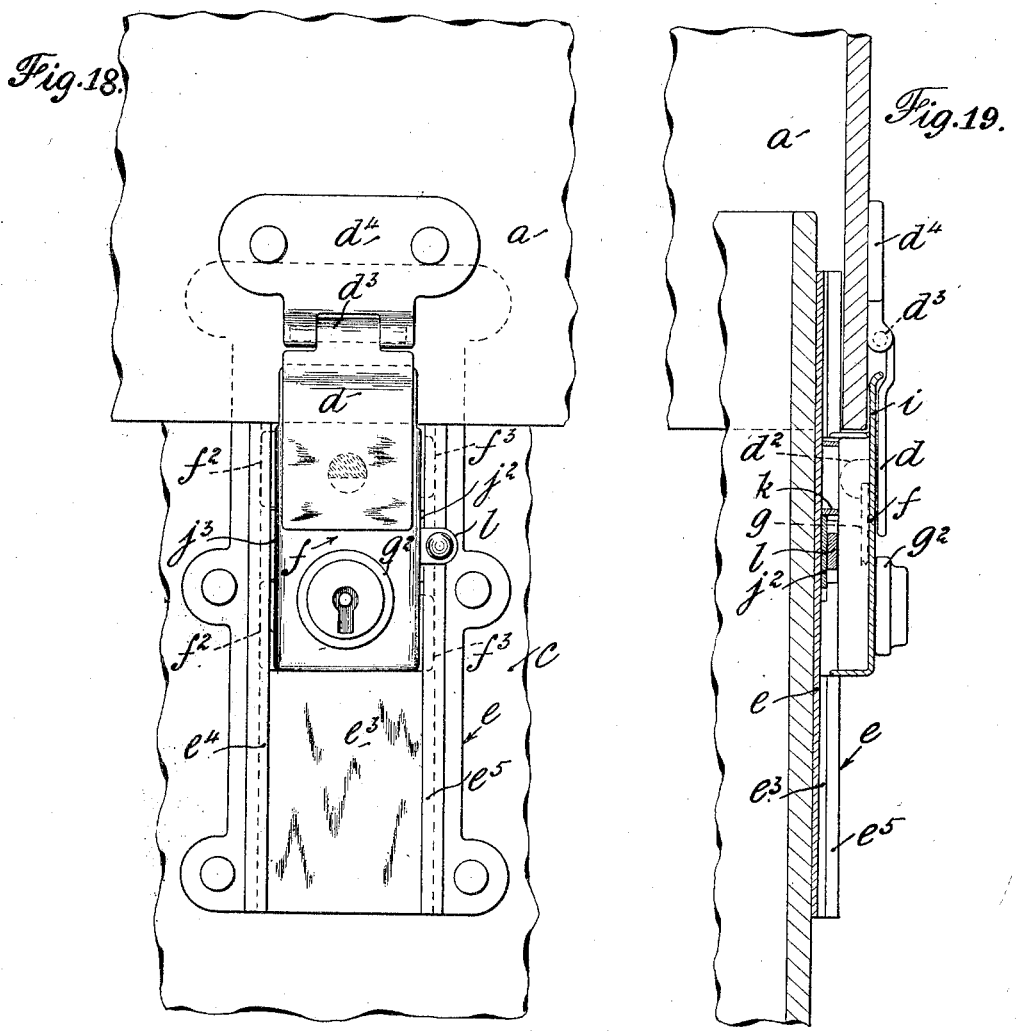
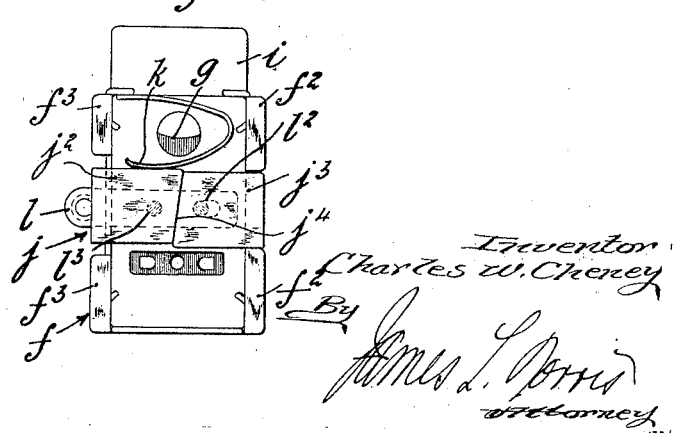
Inventor
Charles W. Cheney
By
Attorney July 9, 1929.  C. W. CHENEY  1,720,467
HASP FASTENING FOR EXPANSIBLE SUITCASES, TRUNKS, AND THE LIKE
Filed April 1, 1927   8 Sheets-Sheet 8
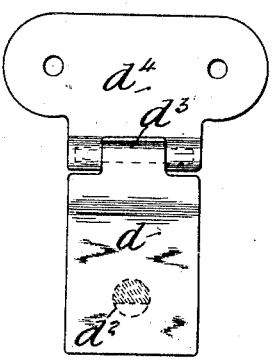
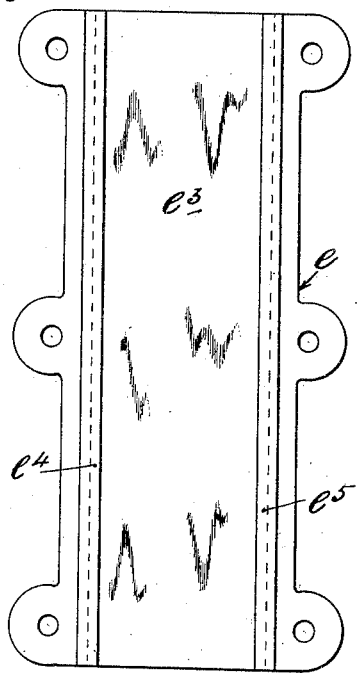
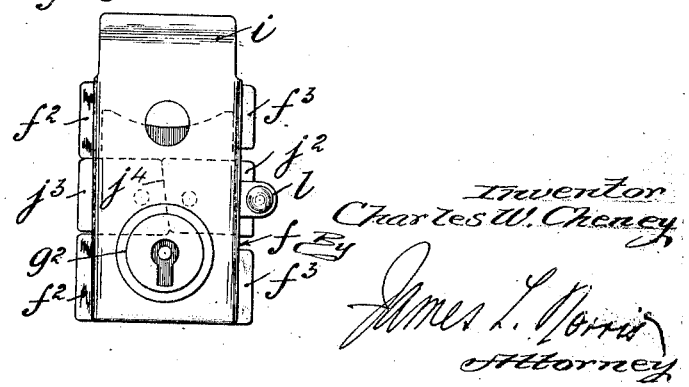
Inventor
Charles W. Cheney
By James L. Norris
Attorney Patented July 9, 1929.

1,720,467

UNITED STATES PATENT OFFICE.

CHARLES WILLIAM CHENEY, OF BIRMINGHAM, ENGLAND.

HASP FASTENING FOR EXPANSIBLE SUITCASES, TRUNKS, AND THE LIKE.

Application filed April 1, 1927, Serial No. 180,288, and in Great Britain May 7, 1926.

The invention provides the hereinafter described and claimed improved hasp fastenings for expansible suit cases, trunks and the like.

An expansible suit case, trunk or the like is a well-known article usually built up of two similar box-like halves engaging each other telescopically, the one half constituting the body and the other half the lid.

The invention provides improved hasp fastenings having greater efficiency under all conditions of use and more simple in their operation, also cheap to produce and of light weight, and distinctive in construction and combination by a hasp member and a bolt member while engaging each other in a normal way with hasp fastenings, one being secured to the lid of the case or the like, being adaptable for sliding as one-piece with ratchet or one-way clutch engagement and release lengthwise over and along an attachment plate secured to the body of the case or the like.

The hasp member and the bolt member are substantially of known construction, and either the one or the other is fixed to the lid of the expansible suit case by a carrier plate, while the other, or the one, is applied to slide lengthwise over and along an attachment plate with ratchet or one-way clutch engagement and release, said attachment plate being fixed to the body of the case depthwise.

The attachment plate can be of the full depth of the case or like body, and the ratchet or one-way clutch action can be substantially for its full length, so that the maximum and minimum capacities of the expansible case can be utilized. No matter into what position the combined hasp member and bolt member is moved upon the attachment plate, the fastenings are just as strong and efficient in action.

One form of the invention uses a hinged hasp, and ratchet teeth on the attachment plate, and carries the pawl on the hasp to engage the ratchet teeth, so that only when the hasp is in engagement with the bolt member is the ratchet pawl in engagement with the ratchet teeth, and vice-versa.

Further the invention provides upon either the bolt member or the hasp member, whichever may be applied to the case body, a rigidly projecting lip under which the closing edge of the lid engages when the case or the like is closed, this feature being of importance for the reason that the carrying handle is usually applied to the lid on the closing side thereof.

Other constructional features combined with the aforesaid form part of the invention as will be made clear from the description hereinafter appearing and the claims.

The drawings forming part hereof represent four forms of the invention, all dominated by the same essential features.

One form of the invention is represented by Figs. 1 to 5, the second form by Figs. 6 to 11, the third form by Figs. 12 to 17 and the fourth form by Figs. 18 to 23.

The same letters of reference are used where possible to indicate corresponding parts in all the figures of the drawings.

Fig. 1 is a front elevation, and

Fig. 2 is a longitudinal section of the fastenings applied to lid and body of an expansible suit case.

Fig. 6 is a front elevation, and

Fig. 7 a longitudinal section of the fastenings applied to the lid and body of an expansible suit case.

Fig. 8 is a section through the hasp only.

Figure 3:
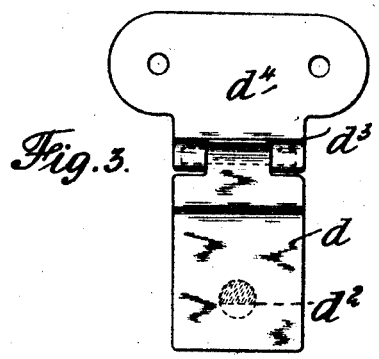
Figs. 3, 4 and 5 are front elevations of the principal parts of the fastenings separate.
Figure 4:
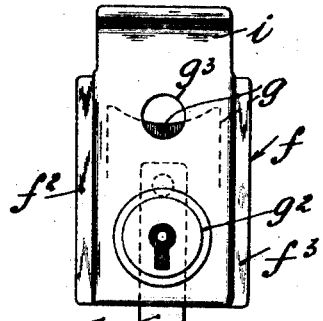
Figure 5:
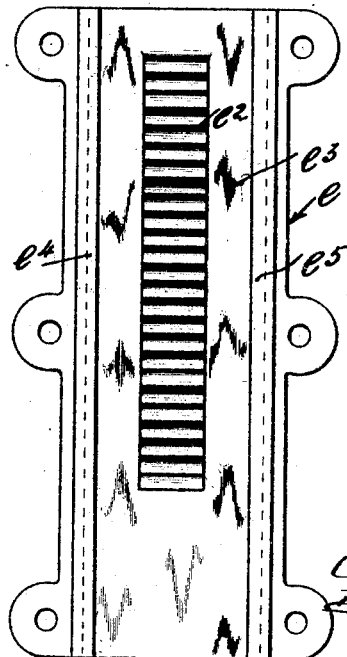
Figure 9:
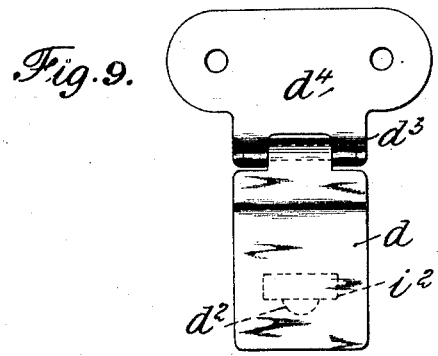
Figure 10:
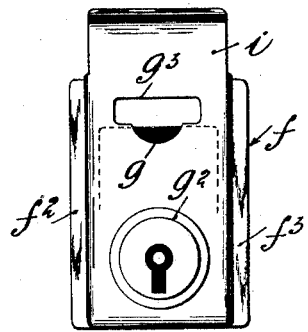
Figure 11:
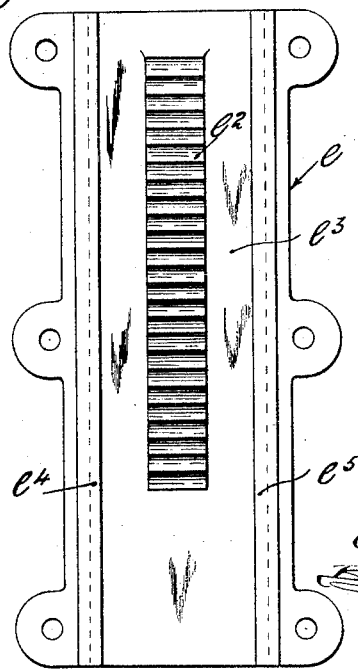

Figs. 9, 10 and 11 are front elevations of the hasp, bolt member and attachment plate separate.

Fig. 12 is a front elevation, and

Fig. 13 a longitudinal section of the fastenings applied to the case.

Fig. 14 is a transverse section through the hasp only.

Figs. 15, 16 and 17 are front elevations of the bolt member, hasp member and attachment plate.

Fig. 18 is a front elevation, and

Fig. 19 a longitudinal section of the fastenings applied to the lid and body of the case.

Fig. 20 is a back elevation of the bolt member.

Figs. 21, 22 and 23 are front elevations of the hasp member, the attachment plate and the bolt member.

With reference to Figs. 1 to 5, the lid of the case is represented at $a$ and the body at $c$, and it is understood that the one fits over the other telescopically, the lid being usually extensibly hinged to the body at the back, and the fastenings applied to the front of the case.

The hasp $d$ is a fly-off hinged one carrying the usual notched peg $d^2$. It is hinged at $d^3$ to a carrier plate, $d^4$, whereby it is secured to the lid $a$.

$e$ is a rigidly built ratchet toothed and grooved attachment plate to be secured depthwise to the body $c$ of the expansible case. The ratchet teeth $e^2$, formed from the plate, are in a longitudinal line in the middle of a longitudinal groove $e^3$ extending for the full length of the plate and provided by inwardly directed opposite hook edges $e^4$, $e^5$. Said plate may be of the full depth of the case body, or of any part of the depth, and the ratchet teeth are in a line of sufficient length to suit the length of the plate.

A rigidly built bolt member $f$ carrying a bolt $g$ is adapted to slide lengthwise upon the attachment plate $e$ within the groove $e^3$, and to be guided by said groove. Its sliding engagement is stiff or with some friction. Side flanges $f^2$, $f^3$, of the bolt member engage the hook edges of the groove. The bolt $g$ is a slidable one applied to the bolt member to be projected by the usual spring, and to be withdrawn by hand from the boss $g^2$ applied to the face of the bolt member, said bolt co-acting with a hole $g^3$ in the bolt member and with the notched peg $d^2$ of the hasp which the active end of the bolt engages. The bolt may be arranged for key-locking in any well-known manner.

At the back said bolt member is fitted with a limb spring $h$ provided with a ratchet-like tooth $h^2$ for engagement with the ratchet teeth of the attachment plate, this spring and tooth constituting a ratchet pawl. When the bolt member $f$ engages the attachment plate $e$ the pawl $h$, $h^2$ engages the ratchet teeth and the bolt member moves downwardly with ratchet action, the movement of said bolt member in the opposite direction being stopped until the limb spring is lifted by hand to disengage the tooth $h^2$ from the ratchet teeth $e^2$, when said bolt member can move upwardly freely.

The bolt member $f$ has upon its front face a rigid projection $i$ under which the closing edge of the lid $a$ engages when the lid and body of the case engage, this projection and its engagement by the closing edge of the lid being extremely useful because the carrying handle to an expansible case or the like is usually applied to the front of the lid.

After the bolt member has been put into position upon the attachment plate to slide over and along it, the ends of the groove are closed down, so that said bolt member can not again become detached.

It will be obvious that the length of the attachment plate may be anything suitable, for the full depth of the body part of the case if desired, and that no matter in what position the bolt member $f$ may be upon said plate it is strongly held, both hasp member and bolt member while engaging each other being slidable as one-piece lengthwise over and along the attachment plate with a ratchet action in one direction and a hand-release in the opposite direction. The hasp fastenings are therefore as strong in operation when the case is fully expanded as when the case is fully contracted.

The second form of the invention differs only from the previous form inasmuch as the ratchet pawl is carried on the hasp instead of upon the bolt member, and only comes into engagement with the ratchet teeth when the hasp is in engagement with the bolt member.

The fly-off hinged hasp $d$ has applied to its inner face a resilient tooth $h^2$ to constitute a pawl, this tooth being housed in a small box $i^2$ rigid with the hasp and transversely thereto and which, together with the pawl, is adapted to pass a fairly good fit through the hole $g^3$ in the front of the bolt member, $f$, so that the pawl may engage the ratchet teeth $e^2$ of the plate $e$, said hole $g^3$ being large enough for said pawl and housing and also for the notched peg $d^2$ to be engaged by the bolt, this peg being a rigid part of the housing. The pawl or tooth $h^2$ resiliently slides in the housing against the coiled springs $h^3$, $h^4$. When the bolt $g$ engages the notched peg $d^2$ the pawl $h^2$ engages the line of ratchet teeth $e^2$ of the attachment plate $e$, so that the combined bolt member $f$ and hasp member $d$ are ratcheted to the attachment plate $e$ in the closing direction of the case. When the hasp is released by the bolt $g$ and flies off the bolt member $f$ is free to be moved up and down from end to end of the attachment plate $e$.

The third form of the invention is the same as the second form except that the hasp member $d$ slides upon the attachment plate $e$ with ratchet action, whereas the bolt member $f$ is fixed to the lid, which is cut-away at $a^2$ for the application of said member. The hasp member $d$ is hinged to a rigidly built carrier plate $d^4$ having the side flanges $f^2$, $f^3$, to engage the groove $e^3$ in the attachment plate $e$, this carrier plate for the hasp member being provided with the extension $i$ under which the closing edge of the lid engages.

The action of this form of the invention is the same as the second form, namely that the ratchet pawl $h^2$ carried by the hasp member engages the teeth $e^2$ of the attachment plate simultaneously with the engagement of the bolt $g$ with the notched peg $d^2$, the ratchet action being released when the hasp member is released.

The fourth form of the invention is similar to the first and second forms with the substitution of a one-way friction clutch for the ratchet action.

The attachment plate $e$ is provided with the groove $e^3$ as formerly, and the bolt member $f$ with the side flanges $f^2$ and $f^3$ to engage said groove, but in addition to said side flanges said bolt member is fitted with a transverse bar $j$ formed of two parts $j^2$, $j^3$, whose outer edges also engage the groove and whose inner edges engage each other by opposed inclinations as at $j^4$. This bar is suitably housed on the bolt member and is adapted to slightly lengthen and shorten by the operation of the opposed inclinations, $j^4$, to grip and slip the groove $e^3$, a double limb spring $k$ operating against the part $j^2$ for gripping and a small hand-operated arm $l$ operating on the part $j^2$ against the spring for slip or release. The bar normally grips the groove with a one-way action permitting the bolt member $f$ moving downwardly upon the attachment plate $e$ but preventing same moving upwardly, which latter can only take place by relieving the gripping friction by hand-rocking the arm $l$ to move the part $j^2$ upwardly. The arm $l$ is pivoted to the part $j^3$ at $l^2$ and connected to the part $j^2$ at $l^3$.

Said bolt member normally slides down the groove $e^3$ freely, but is prevented from sliding upwardly by the operation of the one-way clutch bar $j$ until said clutch is released by hand from the arm $l$, the one-way clutch being normally in action.

It will be clear that all the forms of the invention have the same distinctive feature, namely that while the hasp member and bolt member engage each other, one being adapted for fixing to the lid of the case, they can slide as one-piece with ratchet or one-way clutch engagement and release lengthwise over and along an attachment plate adapted for fixing depthwise to the body of the case, the lid engaging over the attachment plate.

With reference to the one-way friction clutch form such could be arranged to normally free the sliding of the bolt member upon the attachment plate, the hasp member to carry a part which automatically makes the clutch one-way operative when the bolt of the bolt member engages the hasp member.

Having now described my invention, what I claim and desire to secure by Letters Patent is—

1. The combination with two telescopic members, of a fastening device therefor, including a plate for fixed engagement to one member, a second plate fixedly connected to the other member, a slidingly mounted plate carried by one of the plates, a hasp carried by the other of the fixed plates, cooperating means carried by the sliding plate and the hasp for securing the hasp to the sliding plate, and cooperative means carried by the sliding plate and its supporting fixed plate, whereby the sliding plate is permitted free movement in one direction only.

2. A fastening for a suit case or the like of the type comprising a pair of telescoping parts, said fastening including a plate for attachment to one of said parts, a hasp member and a cooperating member, one of which is slidable on the outer face of said plate in the direction of the length of the latter, the other of said members having means for attaching same to the other of said telescoping parts, said hasp member and said cooperating member having interengaging means for securing them together, and means carried by one of said members engageable with said plate to secure said hasp member and cooperating member against unitary movement longitudinally of said plate in one direction and permitting unitary movement of said members longitudinally of said plate in the other direction.

3. A fastening for a suitcase or the like of the type embodying a pair of telescoping parts, said fastening comprising a plate adapted to be secured to one of said telescopic parts in fixed relation thereto, a hasp member and a cooperating member having interengaging means for securing them together, one of said members adapted to be secured to the other of said telescopic parts in fixed relation thereto, and the other of said members being slidable on the outer face of said plate for substantially the full length of the latter, and a pawl and ratchet connection between one of said members and the outer face of said plate, said pawl and ratchet connection being operative, when said hasp member and cooperating member are secured together, to prevent unitary movement of said members longitudinally of said plate in one direction and to permit unitary movement of said members longitudinally of said plate in the opposite direction.

4. A fastening for a suit case or the like of the type which embodies a pair of telescoping parts, said fastening including a plate adapted to be fixedly secured to one of said telescoping parts, said plate having ratchet teeth on its outer face and having a slideway projecting from its toothed face at each of its longitudinal edges, a hasp member and a cooperating member, one of which members is adapted to be fixedly secured to the other of said telescopic parts and the other of which members is movable in the slideways of said plate, said hasp member and cooperating member having interengaging means for detachably securing them together, and a pawl carried by one of said members and ridable over the teeth of said plate when said members are unitarily moved longitudinally of said plate in one direction and engaging said teeth to prevent unitary movement of said members in the opposite direction.

5. A fastening according to claim 4 wherein the member which carries the pawl has a housing on its inner face in which said pawl is mounted and wherein the other member has an opening through which, when said members are secured together, said housing projects, and wherein the interengaging means for securing said members together comprises a bolt carried by the last named member and engageable with said housing.

6. A fastening according to claim 2 wherein the member which is slidable over the fixed plate carried by one of the telescopic parts has means to straddle an edge of the other telescopic part and to lie beneath the other member when the locking member and hasp member are secured together.

In testimony whereof I have signed my name to this specification.

CHARLES WILLIAM CHENEY.